Patented Nov. 14, 1939

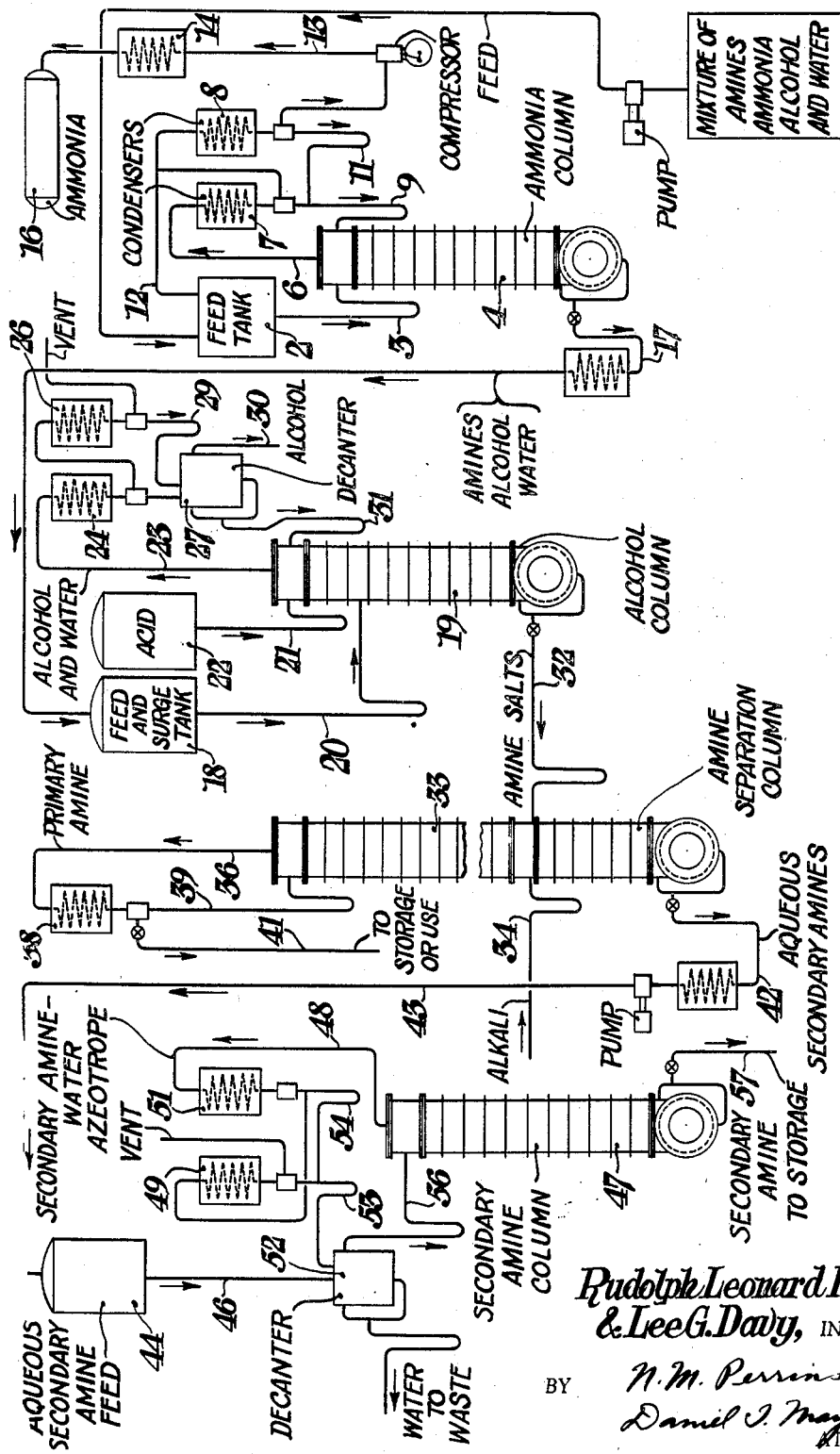

2,180,006

UNITED STATES PATENT OFFICE 2,180,006

PROCESS FOR THE SEPARATION AND REFINING OF AMINES

Rudolph Leonard Hasche and Lee G. Davy, Kingsport, Tenn., assignors to Eastman Kodak Company, Rochester, N. Y., a corporation of New Jersey Application September 9, 1936, Serial No. 99,978

9 Claims. (Cl. 260—583)

This invention relates to the separation and refining of amines and in particular to such treatment applied to amines containing from 3 to 5 carbon atoms.

Various amines and processes of preparation and use are known. Depending upon processes for the preparation, the primary amines may be obtained as more or less impure mixtures and containing other components such as alcohol, ammonia, water, secondary and tertiary amines. While such amines may be useful as produced, it is also desirable to obtain substantially pure amines. However, the production of relatively pure amines from amine mixtures has heretofore occasioned considerable trouble, due to closeness of boiling points, as well as amine decomposition.

We have found a method for the separation, purification and refining of amines which is particularly simple and efficient.

This invention has for one object to provide a process for the separation of amines existing in the form of admixture. Another object is to provide a process for refining and purifying amines. A still further object is to provide a process for preparing relatively pure primary amines. Another object is to provide a process for the preparation of relatively pure secondary amines. A still further object is to provide a process for the separation and refining of mixtures containing aliphatic amines having from 3 to 5 carbon atoms. Still another object is to provide a process for the separation and refining of primary butyl amine. Another object is to provide a process for the separation and refining of amines, which includes distillation wherein the consumption of heat may be kept at a low figure. Another object is to provide a process for the separation and refining of amines, including distillation, wherein at least a part of the heat consumed in the process may be generated therein. A still further object is to provide a process for the separation of amines wherein decomposition thereof is prevented or minimized. Other objects will appear hereinafter.

We have found that if amine-containing mixtures are treated with certain chemicals, separation is not only facilitated, but heat for assisting in separation and refining may also be generated.

For a more complete understanding of our invention, reference is made to the accompanying drawing forming a part of the present application. Fig. 1 is a semi-diagrammatic side elevation view in the nature of a flow sheet disclosing an apparatus arrangement for carrying out my invention.

In Fig. 1, 2 designates a feed tank for the materials to be treated. This tank is connected by conduit 3 to a distillation or flash column 4. This column may be of any usual construction and include bubble plates or packing material. The upper portion of the column is provided with a vapor outlet conduit 6 that leads through one or more condensers 7, 8. Suitable reflux lines 9, 11 connect the condensers with the column. Other conduits 12, 13 connect the condensers with tank 2, the cooler 14 and pressure chamber 16.

The lower portion of column 4 is provided with a draw-off conduit 17 which leads to feed tank 18. This feed tank is connected with another distillation column 19. The upper portion of column 19 is connected by conduit 21 with a source of acid as tank 22.

Column 19 is provided with a vapor outlet conduit 23 which leads to condensers 24 and 26. In this column arrangement a decanter or separator 27 is introduced in the lines 29, 31, which connect the condensers with column 19. This decanter structure and its connections are similar to that shown in Gordon application 744,250, now Patent No. 2,049,440 or Othmer Patent No. 2,028,800. Hence, further description appears unnecessary. The lower portion of column 19 is provided with a valved draw-off 32, which leads to an intermediate point of another distillation column 33. At approximately the same intermediate point of the column is another inlet conduit 34.

Column 33 is also of any known construction and may contain bubble plates or the like. Also, the upper portion of the column is connected through vapor outlet pipe 36 to one or more condensers 38. Reflux lines and draw-off lines are provided at 39 and 41. The lower portion of column 33 may be connected by valved conduit 42 through coolers, surge tank, pumps and lines 43 to another feed tank 44.

Feed tank 44 feeds through conduit 46 either directly or indirectly to the column 47, which is of construction as already described and includes the vapor outlet 48, which leads to one or more condensers 49, 51, then to the decanter 52. This decanter or separator is of a type similar to 27, as already described. Decanter 52 is connected to the condensers by conduits 53, 54 and with the column by conduit 56. If desired, the feed to this column may be introduced through conduit 46 to the decanter. The lower portion of column 47 is provided with a valved draw-off 57 which may lead to a storage tank or other equipment, such as, amine production.

The apparatus may be arranged so that the flow through the system may be caused by gravity, or pumps may be connected in the various conduits in order to pump the materials through the system. Coolers and tanks may be inserted in lines 17, 42, 43 and other modifications made in my apparatus.

The operation of our apparatus as well as an understanding of our novel process for the separation and refining of amines will be readily apparent from a consideration of the following example which is set forth principally for the purposes of illustration. An amine admixture containing butyl amine, dibutyl amine, butyl alcohol and dissolved ammonia, as well as some water from which it was desired to recover the amines, was fed into tank 2. This mixture flowed through conduit 3 into column 4. In this column heat was applied and ammonia vapor carrying with it butyl alcohol, butyl amine and water, passed from the top of the column through conduit 6 and into the several condensers connected thereto. We find that by operating these condensers at sufficiently low temperature, the components other than the ammonia may be caused to condense and return to the column 4 through lines 9 and 11. Preferably, the non-condensed vapor which is primarily ammonia, would be passed through a refrigerated condenser 8 and there any remaining amines, alcohol or the like will be condensed and returned to the column. The ammonia gas may then be compressed, further cooled at 14, and stored in the pressure cylinder 16.

From the base of the column 4 the liquid from which all ammonia has been substantially removed and which in the example now under description contains butyl alcohol, butyl amine, dibutyl amine and some water, will be pumped to column 19. Preferably for convenience of feed, the mixture would be fed into tank 18 which is positioned in the line 17, 20. In column 19 the amine mixture is contacted with sulfuric acid solution fed through conduit 21 into the column at a position above the amine feed. The following reaction takes place:

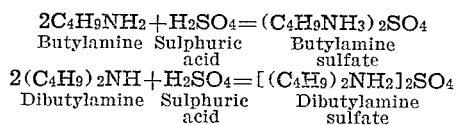

This reaction generates considerable heat. We find that converting the amines in the mixture to sulfates as described facilitates the separation of alcohol and water therefrom without attendant disadvantages of amine decomposition due to heating. Also, some heat may be generated by the contact of sulphuric acid with water. Preferably, however, a relatively dilute sulphuric acid, say from 15 to 40%, will be employed. Further heat may be supplied to column 19 by circulating steam in the lower portion thereof. By this procedure we find that a butyl alcohol-water azeotrope may be caused to leave column 19 through conduit 23. The azeotrope may be condensed in the several condensers 24, 26 and the condensate permitted to separate in the decanter 27. In the example under consideration, the upper layer in decanter 27 will be comprised principally of butyl alcohol and may be withdrawn therefrom through conduit 30 for any desired purpose. The other layer in the decanter which will be comprised principally of water or a part thereof, may be returned to column 19 through conduit 31 to act as reflux.

The materials from which alcohol has been removed in column 19 will flow through the lower portion thereof, and they may be withdrawn through conduit 32 to the amine refining column 33. Preferably, the mixture comprising butyl amine sulphate, dibutyl amine sulphate and water will be fed into column 33 at some intermediate point thereof as shown. This permits the recovery of one amine at the base of the column and the other amine at the head of the column.

An alkali mixture such as, for example, a 15–30% caustic is fed to column 33 at some intermediate point in the vicinity of the amine feed. This alkali will react with the amine salts and regenerate the amines, according to the following equations:

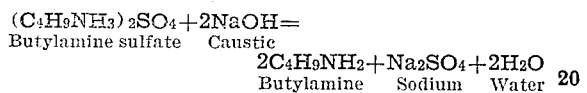

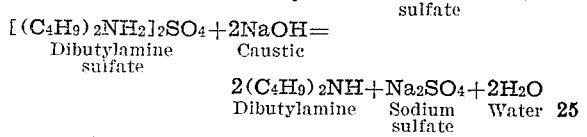

We find that the heat generated by this reaction may be employed in volatilizing butyl amine from the top of the column through conduit 36. Further heat may be supplied to the column to supplement neutralization heat and furnish sufficient to volatilize all of the normal butyl amine from the system. Normal butyl amine may be condensed in condenser 38. A portion thereof may be returned as reflux through conduit 39. Another portion thereof may be withdrawn through 41 for storage or other use. This butyl amine may be of a purity better than 95%.

The lower portion of column 33 will contain dibutyl amine, water, and any excess alkali should such have been added. This mixture of dibutyl amine and accompanying aqueous solution may be conducted from column 33 to various coolers and tanks into column 47 through the decanter in order to provide reflux. Heat will be supplied to the lower portion of column 47.

We find that a mixture of dibutyl amine and water may be caused to distill from the head of column 47 through conduit 48. This mixture may be condensed in condenser 51 and passed to decanter 52. In decanter 52 the butyl amine-water will separate into two layers. The water layer may be discharged to waste and the dibutyl amine layer may be returned through conduit 56 to column 47. The dibutyl amine returned to the column carries over further water as an azeotrope through conduit 48 which is likewise separated and discharged to waste. This procedure may be continued until substantially all of the water is removed, leaving substantially anhydrous dibutyl amine in column 47. Substantially anhydrous dibutyl amine may be withdrawn through conduit 57 for storage or other use.

It is therefore apparent from the above description that we have provided a procedure wherein amine mixtures may be separated and individual amine components recovered in a relatively high state of purity. In accordance with our invention the separation of the amines from various other components may be caused to take place without material decomposition of the amines. Also, the separation and refining may be obtained by procedure wherein heat costs are reduced because of the fact that we are able to generate some of the heat chemically and utilize this generated heat. In accordance with my procedure the primary amine which in many instances is the desired product, is obtained in a relatively high state of purity.

Although we have described our invention with particular reference to butyl amine because our process is very suitable for the treatment of such higher amines, which may tend to decompose during separation and refining, our invention has wider applications. For example, we may employ our procedure in the separation of the various amyl amines from amyl alcohol, water, ammonia, and other components, as well as in the treatment of certain other amines such as propyl and the like.

From the foregoing it is apparent that our invention has various applications of which the above has been set forth for the purposes of illustration. It is apparent that if the amine mixture to be treated contained no ammonia, then the aforementioned step of ammonia separation would be dispensed with and the amine mixture treated in columns 19, 33 and 47 as described. Consequently our invention is not to be restricted excepting insofar as necessitated by the spirit of the appended claims and the prior art.

What we claim and desire to secure by Letters Patent of the United States is:

1. A process for the separation and refining of lower alkyl amines, which comprises subjecting a mixture containing primary amines, secondary amines, alcohol, water and ammonia to a distillation treatment which volatilizes ammonia as well as some of the amines and alcohol from the mixture, subjecting the vapors to cooling sufficiently low to condense components other than ammonia, compressing and recovering the ammonia, treating the remaining mixture with sulphuric acid to convert the lower alkyl amines to amine sulfates, distilling alcohol and water from the amine sulfates, reconverting the amine sulfates to amines by the addition of sodium hydroxide, and separating the primary amines from other amines by distillation.

2. A process for the separation and refining of lower alkyl amines which comprises treating a mixture containing alkyl amines, alcohol and water with 15% to 40% sulfuric acid, whereby the amines are converted to amine sulfates with heat generation, employing the generated heat in assisting in the vaporization of alcohol and water from the amine sulfates, liberating amines from the amine sulfates by adding 15 to 40% sodium hydroxide thereto and separating the liberated amines by distillation.

3. A process for the separation and refining of materials containing butyl amine, which comprises treating a mixture containing primary butyl amine, dibutyl amine, butyl alcohol, ammonia and water to remove ammonia therefrom by distilling the mixture at a temperature high enough to drive off ammonia, contacting the remaining mixture with sulphuric acid to convert the butyl amines to amine salts, distilling off butyl alcohol-water azeotrope from the amine salts, subjecting the amine salts to treatment with sodium hydroxide followed by distillation for the liberation and separation of primary butyl amine and dibutyl amine, and subjecting the dibutyl amine to further distillation for removing water.

4. A process for the treatment of mixtures containing butyl amines, which comprises contacting a mixture containing primary butyl amine, dibutyl amine, butyl alcohol and water with a sulfuric acid which converts the butyl amines to salts with a liberation of heat, utilizing generated heat for assisting in volatilizing a butyl alcohol-water azeotrope from the butyl amine salts and recovering butyl amines from the amine salts by the reaction therewith of an alkali metal hydroxide.

5. A process for the treatment of mixtures containing amyl amines, which comprises contacting a mixture containing primary amyl amine and other amyl amines and alcohol and water with non-oxidizing mineral acid which converts the amyl amines to salts with a liberation of heat, utilizing generated heat for assisting in volatilizing an amyl alcohol-water azeotrope from the amyl amines salts and recovering amyl amines from the amine salts by the reaction therewith of an alkali metal hydroxide.

6. In a process for the separation and refining of amines the steps which include obtaining an aqueous dibutyl amine mixture, by treating a dibutyl amine salt with sodium hydroxide, subjecting the aqueous mixture to distillation whereby a distillate comprising a dibutyl amine-water azeotrope is formed, condensing the azeotrope, permitting the condensate to separate into a water layer and a dibutyl amine layer, and returning at least a part of the dibutyl amine layer to the mixture undergoing distillation.

7. A process for the separation and refining of dibutyl amine, which comprises treating an amine salt with sodium hydroxide to obtain an aqueous solution of dibutyl amine, subjecting the aqueous solution to distillation whereby a distillate comprising dibutyl amine-water azeotrope is formed, condensing the azeotrope, permitting the condensate to separate into a water layer and an amine layer, and returning at least a part of the amine layer to the mixture undergoing distillation.

8. A process for the separation and refining of lower alkyl amines, which comprises subjecting a mixture of primary amines, secondary amines, alcohol, water and ammonia, to treatment for removing ammonia by distilling the mixture at a temperature high enough to drive off the ammonia, treating the mixture remaining with a non-oxidizing mineral acid which converts the amines to salts, removing at least a part of the alcohol from the amine salts by distillation, reconverting the amine salts to amines by reaction with an alkali metal hydroxide, and separating by distillation the primary amines from the other amines produced.

9. A process for the separation and refining of lower alkyl amines, which comprises subjecting a mixture containing primary amines, secondary amines, alcohol, water and ammonia to a distillation treatment which volatilizes at least the major part of the ammonia, treating the mixture remaining with a non-oxidizing mineral acid which reacts with the lower alkyl amines and converts them to salts, distilling alcohol and water from the amine salts, reconverting the amine salts to amines by the addition of an alkali metal hydroxide, and separating primary amines from the other amines in the mixture by distillation.

RUDOLPH LEONARD HASCHE.
LEE G. DAVY.